United States Patent [19]

Reiter et al.

[11] 4,413,117

[45] Nov. 1, 1983

[54] PREPARATION OF POLYIMIDE POWDER

[75] Inventors: Udo Reiter, Mutterstadt; Jenoe Kovacs, Bobenheim-Roxheim; Hans-Uwe Schenck, Wachenheim, all of Fed. Rep. of Germany

[73] Assignee: BASF Aktiengesellschaft, Fed. Rep. of Germany

[21] Appl. No.: 385,273

[22] Filed: Jun. 4, 1982

[30] Foreign Application Priority Data

Jun. 22, 1981 [DE] Fed. Rep. of Germany ....... 3124401

[51] Int. Cl.$^3$ .............................................. C08G 73/10
[52] U.S. Cl. .................................... 528/497; 528/188;
528/353; 528/498; 528/501; 528/481
[58] Field of Search ............... 528/497, 498, 353, 188,
528/481, 501

[56] References Cited

U.S. PATENT DOCUMENTS

| 3,179,631 | 4/1965 | Endrey | 528/353 |
| 3,422,061 | 1/1969 | Gall | 260/47 |
| 3,607,838 | 9/1971 | Strickrodt et al. | 528/353 |
| 3,619,329 | 11/1971 | Wright | 156/500 |
| 3,708,459 | 1/1973 | Lubowitz | 528/353 |
| 3,803,081 | 4/1974 | Lubowitz | 528/188 |
| 4,075,171 | 2/1978 | D'Alelio | 528/353 |

Primary Examiner—Lester L. Lee
Attorney, Agent, or Firm—Keil & Witherspoon

[57] ABSTRACT

A polyimide powder particularly suitable for the production of moldings by high pressure sintering is prepared by mixing a solution of an aromatic polyimidoacid, obtained by a conventional process and having an intrinsic viscosity of 1.5 to 2.5 dl/g, in an aprotic dipolar organic solvent, with a water-entraining agent, heating the mixture to the boiling point of the entraining agent, azeotropically distilling off the water formed, filtering off the polyimide powder which precipitates, washing it if appropriate, and drying it.

4 Claims, No Drawings

PREPARATION OF POLYIMIDE POWDER

The present invention relates to a process for the preparation of a polyimide powder, and to its use.

It is known that solutions of aromatic polyamido-acids in dipolar aprotic solvents can be prepared. The polyamido-acid (=PAA) may be converted to the corresponding polyimide (=PI) by heating to above 50° C. (German Laid-Open Application DOS 1,904,988) or by heating to above 50° C. with simultaneous reaction with acetic anhydride/pyridine (German Published Applications DAS No. 1,198,547 and DAS 1,202,981). In another process, the polyamido-acid solution is diluted with solvent and precipitated in methanol (or water). On drying, the precipitated powder is converted to the polyimide (U.S. Pat. No. 3,422,061). However, all these processes suffer from substantial disadvantages. Thus, in most cases, eg. the precipitation method, very large amounts of solvent are needed. The residual solvent must be washed very carefully out of the precipitated powder—since even minute amounts remaining in the powder interfere with subsequent processing—and accordingly such washing is very expensive. On heating the PAA in the solvent to above 50° C., the polyimide powder obtained is of insufficiently high molecular weight. The use of acetic anhydride/pyridine is expensive and complicated.

It is an object of the present invention to provide a process for the preparation of polyimide powders which does not suffer from these disadvantages.

We have found that this object is achieved by a process for the preparation of polyimide powder from a conventionally obtained polyamido-acid solution, wherein an aromatic polyamido-acid, of intrinsic viscosity from 1.5 to 2.5 dl/g, dissolved in an aprotic dipolar organic solvent, is mixed with a water-entraining agent, the mixture is heated to the boiling point of the entraining agent, the water formed is distilled off azeotropically and the polyimide powder which precipitates is filtered off, washed if appropriate, and dried.

The present invention also provides the use of these polyimide powders for the production of moldings by high pressure sintering.

It is surprising that the cyclization reaction of the polyamido-acid to give the polyimide can be carried out in such an advantageous manner by the use, according to the invention, of a water-entraining agent. The water formed is distilled off azeotropically and a finely divided polyimide powder is obtained, which is very suitable for further processing.

Concerning the components used in the process according to the invention, the following details may be noted:

The aromatic polyamido-acid can be obtained by a conventional process from dianhydrides of aromatic tetracarboxylic acids and aromatic di-primary diamines.

Suitable dianhydrides of aromatic tetracarboxylic acids are those of the general formula

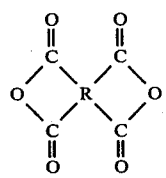

where R is a tetravalent radical which contains one or more aromatically unsaturated six-membered carbon rings, the four carbonyl groups are bonded directly to various carbon atoms, and each pair of carbonyl groups is bonded to adjacent carbon atoms in a six-membered aromatically unsaturated ring of the radical R, eg. pyromellitic dianhydride, 2,3,6,7-naphthalenetetracarboxylic acid dianhydride, 3,3',4,4'-diphenyltetracarboxylic acid dianhydride, 1,2,5,6-naphthalenetetracarboxylic acid dianhydride, 2,2',3,3'-diphenyltetracarboxylic acid dianhydride, 2,2-bis-(3,4-dicarboxyphenyl)-propane dianhydride, bis-(3,4-dicarboxyphenyl)-sulfone dianhydride, bis-(3,4-dicarboxyphenyl)-ether dianhydride, 2,2-bis-(2,3-dicarboxyphenyl)-propane dianhydride, 1,1-bis-(2,3-dicarboxyphenyl)-ethane dianhydride, 1,1-bis-(3,4-dicarboxyphenyl)-ethane dianhydride, bis-(2,3-dicarboxyphenyl)-methane dianhydride, bis-(3,4-dicarboxyphenyl)-methane dianhydride, 3,4,3',4'-benzophenonetetracarboxylic acid dianhydride and mixtures of these.

Pyromellitic dianhydride and benzophenonetetracarboxylic acid dianhydride are preferred.

Suitable aromatic di-primary diamines are those of the general formula $H_2N-R'-NH_2$, where $R'$ is a divalent polycyclic aromatic radical. Examples of such radicals $R'$ are

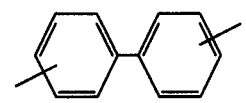

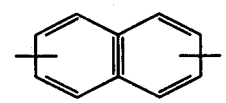

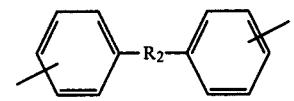

and

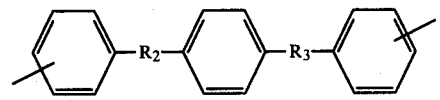

where $R_2$ and $R_3$ are chosen from amongst carbon in the form of alkylene chains of 1 to 3 carbon atoms, oxygen, sulfur or $-SO_2$. Examples of such diamines are 4,4'-diaminodiphenylpropane, 4,4'-diaminodiphenylmethane, 4,4'-diaminodiphenylamine, benzidine, 4,4'-diaminodiphenyl sulfide, 4,4'-diaminodiphenyl sulfone, 3,3'-diaminodiphenyl sulfone, 4,4'-diaminodiphenyl ether, bis-(4-aminophenyl)diethylsilane, bis-(4-aminophenyl)-phenylphosphine oxide, bis-(4-aminophenyl)-N-methylamine, 1,5-diaminonaphthalene, 3,3'-dimethyl-4,4'-diaminobiphenyl, 3,3'-dimethoxybenzidine, 1,4-bis-(p-aminophenoxy)-benzene, 1,3-bis-(p-aminophenoxy)-benzene and mixtures of these.

Preferred diamines are diaminodiphenylmethane and diaminodiphenyl ether.

Examples of aprotic dipolar organic solvents in which the polyamido-acids can advantageously be prepared and dissolved are N,N-dimethylacetamido and especially N,N-dimethylformamide, N-methylpyrrolidone and dimethylsulfoxide, as well as mixtures of these; they are in general employed in amounts of from 95 to 75, preferably from 90 to 80, % by weight based on solution. The dianhydrides of the aromatic tetracarboxylic acids are in general reacted with equimolar amounts of the aromatic diprimary diamines to give the polyamido-acids.

The polyamido-acid solutions can particularly advantageously be prepared by first adding about 90–95 equivalent % of the dianhydride of the aromatic tetracarboxylic acid to a solution of the aromatic di-primary diamine in a dipolar aprotic organic solvent at from about 0° to 30° C., and, when the reaction has subsided, adding more of the dianhydride of the tetracarboxylic acid, a little at a time (for example 2.5 equivalent % at a time), at from about 0° C. to 40° C., until an intrinsic viscosity of from 1.5 to 2.5 dl/g is reached.

According to the invention, a water-entraining agent is added to the polyamido-acid solution, the mixture thus obtained is heated to the boiling point of the entraining agent, and the water formed during conversion of the polyamido-acid to polyimide (which polyimide precipitates during the reaction) is distilled off azeotropically.

It is advantageous to separate the distilled entraining agent from the water in a conventional water separator and recycle it to the reaction mixture, ie. to remove the water from the system.

Suitable entraining agents are those conventionally used for removing water, in particular aromatic hydrocarbons, eg. benzene, toluene and xylene, and halohydrocarbons, eg. chlorobenzene. Particularly preferred entraining agents are toluene and xylene. The entraining agents are in general employed in amounts of from 10 to 40, preferably from 15 to 25, % by weight based on solution.

The polyimide obtained by the process according to the invention precipitates as a fine powder which is filtered off, washed, if appropriate, with a methanol/-water mixture, and finally dried.

Drying can be effected in two stages, namely a predrying at 100° to 150° C. for 12 hours, followed by the main drying at 250°–300° C. for 2 hours, if appropriate under reduced pressure.

The polyimide powders have intrinsic viscosities (measured in a 0.5% strength solution in concentrated $H_2SO_4$) of from 0.6 to 1.2, and bulk densities of about 200–300 g/l.

The polyimide powders obtained according to the invention are outstandingly suitable for converting to moldings by sintering, particularly advantageously by high pressure sintering.

The moldings produced from the powders of high intrinsic viscosity, which themselves are obtained particularly advantageously by the process claimed, exhibit especially good properties in respect of elongation at break.

In the Example, parts and percentages are by weight, unless stated otherwise.

EXAMPLE 80 parts of diaminodiphenyl oxide and 1,000 parts of N-methylpyrrolidone (=NMP) were introduced into a reaction vessel which could be heated and cooled and was equipped with a stirrer, water separator, reflux condenser and nitrogen inlet tube. 122.4 parts of benzophenone-tetracarboxylic acid dianhydride (=BTDA) dissolved in 183 parts of NMP were added. When the reaction was complete, $2 \times 3.21$ parts of BTDA (2.5 mole %) were added and the increase in viscosity was monitored. The solution viscosity rose to 34,655 mPa.s, corresponding to an intrinsic viscosity $\eta_{int} = 1.62$ dl/g. 280 parts of xylene were then added to the very viscous solution, which was heated for 4 hours at 170° C., the water formed being removed azeotropically from the reaction mixture. The polyimide which precipitated was filtered off, washed once with a 1:1 methanol/$H_2O$ mixture and dried for 12 hours at 150° C. followed by 2 hours at 300° C. The bulk density was 240 g/l. The intrinsic viscosity $\eta_{int} = 1.15$ dl/g. The powder was converted, by high pressure sintering (at 360° C. under a pressure of 6,250 kg/cm$^2$), to moldings having the following properties:
elongation at break $\epsilon_B = \epsilon_R = 2.6\%$;
notched impact strength = 2.64 Nmm/m$^2$
hardness H 30 = 294 N/mm$^2$;
modulus of elasticity = 4,870 N/mm$^2$.

COMPARATIVE EXAMPLE

The Example of German Laid-Open Application DOS. No. 1,904,988 was repeated carefully. The powder obtained had an intrinsic viscosity of 0.357 dl/g (as an 0.5% strength solution in concentrated $H_2SO_4$) and could not be converted to compact moldings by high pressure sintering (at 380° C. under a sintering pressure of 6,250 kg/cm$^2$).

We claim:

1. A process for the preparation of polyimide powder which comprises: adding an inert entraining agent for water to a solution of an aromatic polyamido-acid having an intrinsic viscosity of from 1.5 to 2.5 dl/g, said polyamido-acid being dissolved in an aprotic dipolar organic solvent; heating the formed mixture to the boiling point of the entraining agent to convert the polyamido-acid to polyimide with the formation of water and to azeotropically distill off the formed water along with the entraining agent; and thereafter filtering the polyimide powder which precipitates out of the solution and drying the powder.

2. The process of claim 1, wherein the aromatic polyamido-acid is a reaction product of a dianhydride of an aromatic tetracarboxylic acid with an aromatic di-primary amine.

3. The process of claim 1 or 2, wherein the entraining agent used is an aromatic hydrocarbon.

4. The process of claim 1, wherein the entraining agent is toluene or xylene.

* * * * *